United States Patent [19]

Gupta et al.

[11] Patent Number: 5,113,391
[45] Date of Patent: May 12, 1992

[54] INTELLIGENT CHANNEL UNIT

[75] Inventors: Dev V. Gupta, Flemington; Y. Brian Chen, Somerville; Joel T. Tarantino, Kendell Park, all of N.J.

[73] Assignee: Integrated Network Corporation, Bridgewater, N.J.

[21] Appl. No.: 556,010

[22] Filed: Jul. 20, 1990

[51] Int. Cl.$^5$ .......................... H04J 3/22; H04J 1/16; H04J 3/14

[52] U.S. Cl. ........................................ 370/84; 370/16

[58] Field of Search ............... 370/58.1, 58.2, 58.3, 370/60, 60.1, 85.15, 84, 67, 66, 16, 16.1, 85.15

[56] References Cited

U.S. PATENT DOCUMENTS

| | | | |
|---|---|---|---|
| 3,633,166 | 1/1972 | Picard et al. | 370/85.15 |
| 4,564,940 | 1/1986 | Yahata | 370/67 |
| 4,792,944 | 12/1988 | Takahashi et al. | 370/84 |
| 4,885,741 | 12/1989 | Douskalis | 370/84 |
| 4,991,172 | 2/1991 | Cidon et al. | 370/60 |

Primary Examiner—Douglas W. Olms
Assistant Examiner—Wellington Chin
Attorney, Agent, or Firm—Hamilton, Brook, Smith & Reynolds

[57] ABSTRACT

An Intelligent Channel Unit for interfacing end user stations to a DDS digital data communications network and for processing network and end user data according to digital data communications applications is described. The ICU comprises data processing circuitry consisting of a programmable processing circuitry (PPC), a microprocessor controller, and a memory device; a bypass circuit; three input/output data ports; and interface units for the control, maintenance, and test functions.

44 Claims, 9 Drawing Sheets

INTELLIGENT CHANNEL UNIT

TECHNICAL FIELD

This invention is in the field of digital data communication systems.

BACKGROUND ART

In typical digital data communication applications, a number of end user stations communicate among themselves or with a host computer using a high quality digital communication line. One example is that of the widely used Digital Data System (DDS), a fully synchronous digital communication system that offers high quality data service at a number of standard end user subrates. To communicate over the DDS network, an end user station must be coupled to the network by interfacing and data processing equipment. For example, in the Digital Cross-connect System (DCS) of the prior art shown in FIG. 1, each end user station 2000 is coupled to a channel unit 2002. The channel unit is in turn coupled to a DSO dataport 2004 by a DSX-O wire connection 2006. The outputs of the DSO dataports corresponding to all of the end user stations are then multiplexed together onto a single high-rate T1-line 2008 which is capable of accommodating as many as 24 DSO dataports. This T1 line is coupled to data processing circuitry 2010 comprising two DS1 line cards 2012 and 2016 and an application-specific hardware and software card 2014. Specifically, a first DS1 line card 2012 couples the T1 line to the hardware/software card, and a second DS1 line card 2016 couples the hardware/software card to the DDS network.

Several drawbacks characterize the DCS. Equipment and software instructions contained in the hardware/software card depend on the application in which the end user stations are operating.

One well-known example is the Multipoint Junction Unit (MJU) application. In this application, a number of branch stations (end users) share a DDS communication channel to a host station by using a DCS connection equipped with a hardware/software card dedicated to perform the MJU function. While the host may broadcast to all branch stations in the downstream direction, only one branch station can communicate with the host at any given time in the upstream direction. It is the individual end user stations that are responsible for exercising the proper line discipline, so that no two stations are transmitting simultaneously.

Another standard application consists of Subrate Data Multiplexing (SRDM). Here, the low rate data corresponding to a number of and user stations is multiplexed onto a single high rate DDS channel, to achieve increased transport efficiency. The multiplexing function is performed by a dedicated SRDM hardware/software card.

Hence, since a DCS implementation is equipped with hardware and software dedicated to a particular application, entirely different data processing equipment must be used from application to application. This drawback is particularly acute since end user stations must participate in a number of different applications.

Another problem with the DCS implementation arises from the fact that a single central data processor is responsible for processing data for all of the end user stations. Consequently, if this data processor malfunctions, all of the end user stations are affected.

Additionally, a substantial amount of wiring is needed to couple the various components comprising the DCS implementation, and these components are typically located at a number of different facilities. This results in difficulties in troubleshooting and maintaining the system.

Finally, the DCS implementation is expensive. A substantial expense is inherent in the amount of wiring that is needed, as mentioned above. Also, the incremental cost per end user branch is on the order of $500.

SUMMARY OF THE INVENTION

The present invention, the Intelligent Channel Unit (ICU), provides an improvement that considerably lowers the system complexity and cost associated with prior art. This reduction in complexity and cost is accomplished by combining into a single ICU the interface function provided by the channel unit, the DSX-O connection, and the DSO dataport and the data processing function provided by the dedicated hardware/software card. In effecting this improvement, the central processor of the prior art is replaced by a distributed set of processors. That is, each ICU (which corresponds to a single end user station) has its own data processing circuitry. Furthermore, the ICU can be programmed to perform a variety of functions that are typically desired in a digital data communications environment. This reprogramming feature also reduces cost and complexity in obviating the need for dedicated hardware for each application. Additionally, the ICU can be used to perform the interface function of a prior art channel unit.

The ICU is comprised, in general, of (1) data processing circuitry consisting of a programmable processing circuit (PPC), a microprocessor controller, and an EPROM memory; (2) a bypass circuit; (3) three input/output data ports A, B and C; and (4) interface units for the control, maintenance and test functions. In a typical embodiment, a number of ICU's, each coupled to an end user, are connected in cascade, with port C of an ICU being connected to port B of the next ICU in the cascade. The cascade connection eliminates a significant amount of wiring. Port A of each ICU is connected to and accepts time compressed and multiplexed (TCM) signals from the end user equipment, and subsequently decodes the signals using TCM logic circuitry.

During normal operation in representative applications, such as SRDM applications, the end user data entering port A arrives at the PPC where it is combined with data entering through port B and is subsequently transmitted through port C. In the opposite direction, data received at the PPC via port C is processed to extract data to be sent to the end user. The data is transmitted to the end user through port A, while the received data stream is transmitted to the remainder of the cascaded units through port B. The data processing that takes place in the PPC depends on the hardware function (e.g., SRDM, MJU, Port Concentration) that the microprocessor controller has programmed into the PPC by reading data bits stored in the EPROM and also upon software instructions executed by the controller.

In abnormal conditions, such as when an ICU in the cascade fails and goes out-of-service or if any or all of the ICU's are reprogrammed with new operating parameters or to serve a new function, the ICU automatically takes compensating action. An out-of-service ICU severs the cascaded configuration and thereby disrupts service to the other ICU's in the cascade. An ICU, whose PPC is being reprogrammed by its controller, acts unpredictably on data streams entering the ICU while the reprogramming is taking place. This affects other ICU's in the cascade. In both of these cases, the ICU's bypass circuit provides an alternate route for incoming data streams that bypasses the rest of the out-of-service ICU. In addition, the bypass circuit matches any delays that would have been encountered by the data had it traveled along the non-bypassed route.

Finally, the ICU of the present invention costs approximately one-third of the DCS incremental cost per end user station.

DETAILED DESCRIPTION OF THE INVENTION

I. ICU General Structure

Figure 2:
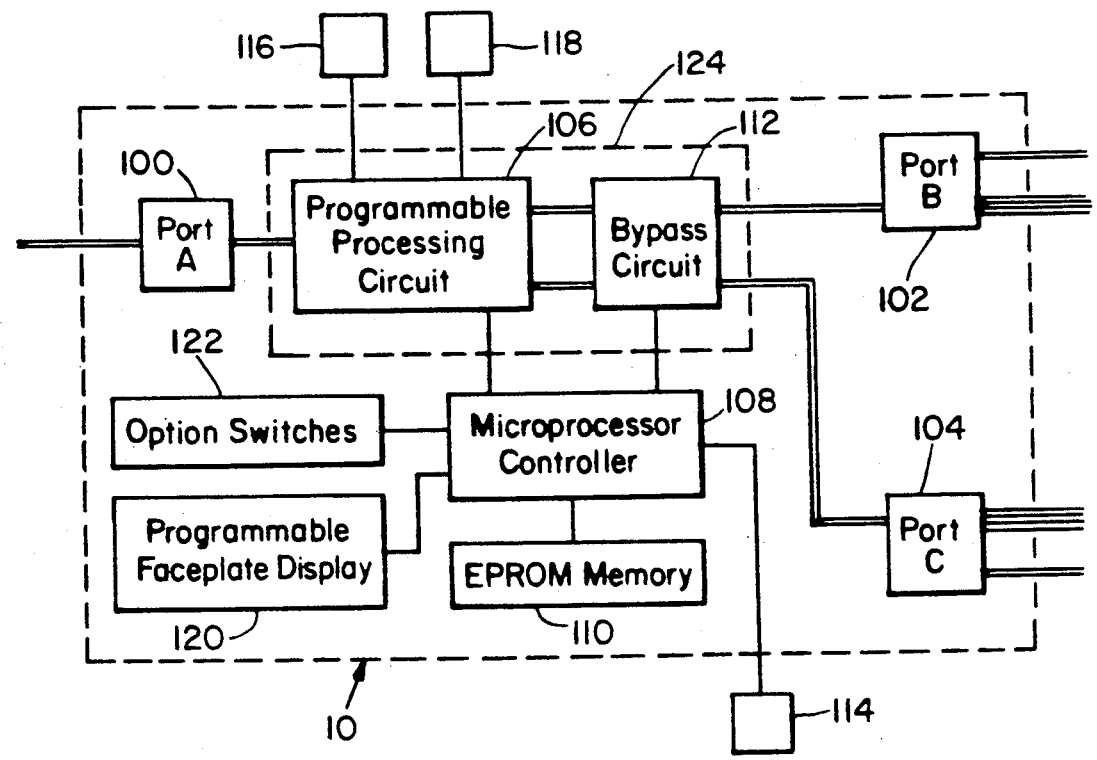
FIG. 2 is a block diagram of an Intelligent Channel Unit (ICU) of the present invention.

The general structure and operation of the Intelligent Channel Unit (ICU) of the invention will now be described in connection with FIGS. 2-7 of the drawings. FIG. 2 is a block diagram of the ICU 10. The ICU is comprised of four broad categories of equipment: (1) three input/output (I/O) ports A, B and C designated by reference numerals 100, 102, 104 respectively; (2) data processing circuitry consisting of a programmable processing circuit (PPC) 106, a microprocessor controller 108, and an EPROM memory 110, wherein the controller 108 programs the PPC 106 by reading instructions stored in the EPROM memory; (3) a bypass circuit 112 which serves as an alternate route for data in the event of chip failure and in the event that the PPC 106 is being reprogrammed by the controller; and (4) interface units 114, 116 and 118 for the respective control, maintenance and test functions, a display panel 120, and mechanically-activated option switches 122.

A. Data Format

Figure 3:
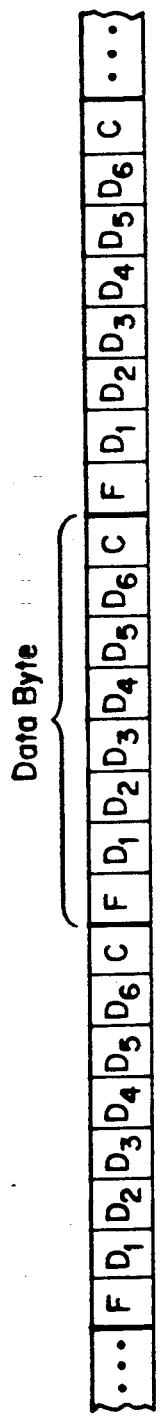
FIG. 3 depicts a DSO data stream as well as the bit format for a DSO data byte.

Before further describing the structure of the ICU, it is useful to describe the data formats and conventions used. The data format used throughout the ICU (except in parts of port A, as will be described) is the DSO standard format. As shown in FIG. 3, a DSO data byte consists of a framing bit F followed by six bits of user data $D_1, D_2, \ldots, D_6$ and a control bit C. The individual data bytes appear in a stream of 64 kb/s data.

Figure 4A:
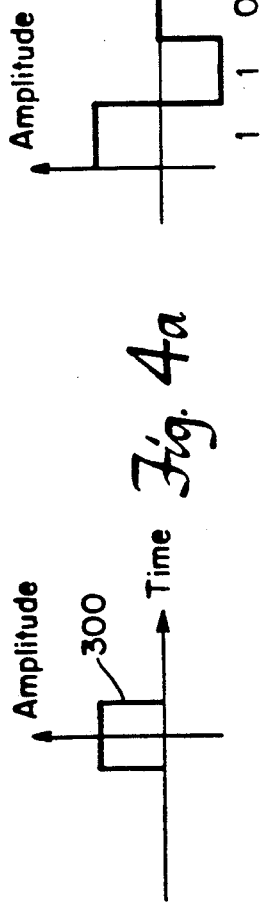
FIG. 4a shows an example of an individual pulse of a Pulse Amplitude Modulated (PAM) signal.
Figure 4B:
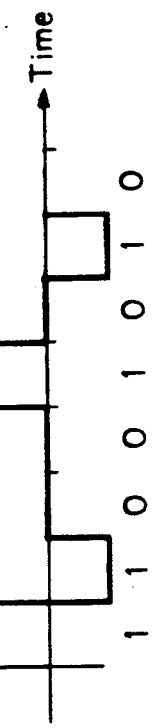
FIG. 4b shows an example of an Alternate Mark Inversion - Pulse Amplitude, Modulated (AMI-PAM) signal.

There are several electrical signal representations that may be used to signify binary '0' and '1' in the DSO format. In this embodiment, both pulse amplitude modulation (PAM) and alternate mark inversion (AMI) PAM signals are used. In PAM, a string of bits is represented by the presence (if the bit is '1') or absence (if the bit is '0') of a pulse 300 such as that shown in FIG. 4a. In AMI-PAM, the pulses corresponding to every other '1' in the bit stream are replaced by pulses of negative polarity, in order to maintain a zero DC level over large bit strings. An example of an AMI-PAM signal is shown in FIG. 4b.

The PAM and AMI-PAM representations are implemented in different ways. The PAM signal is carried by a single wire in the Transistor-Transistor Logic (TTL) format. In contrast, the AMI-PAM signal is implemented by a balanced two-wire signaling scheme, in which two electrical signals are present, each on a separate wire. The difference between the two electrical signals yields the signal being transmitted. The more complex balanced two-wire system is used in lieu of the TTL format for the purpose of reliable communication over distances longer than three feet. Since bidirectional communication requires two wires to carry the electrical signals in the TTL format and four wires to do so in the balanced two-wire format, the two formats are also known as the 'two-wire' and 'four-wire' formats, respectively. (Note the distinction here between 'balanced two-wire' and 'two-wire'.)

B. Ports B and C

While the DSO-TTL format is used exclusively in those parts of the ICU enclosed by the dotted box 124 in FIG. 2, ICU's can be interfaced to one another through either of the two signaling formats. Specifically, ports B and C are interfaces capable of accommodating both the DSO-TTL and DSO-four-wire formats and each consist of a two-wire interface connected in parallel with an interface that consists of standard circuitry that converts data signals in the two-wire format into the four-wire format and vice-versa.

Figure 5:
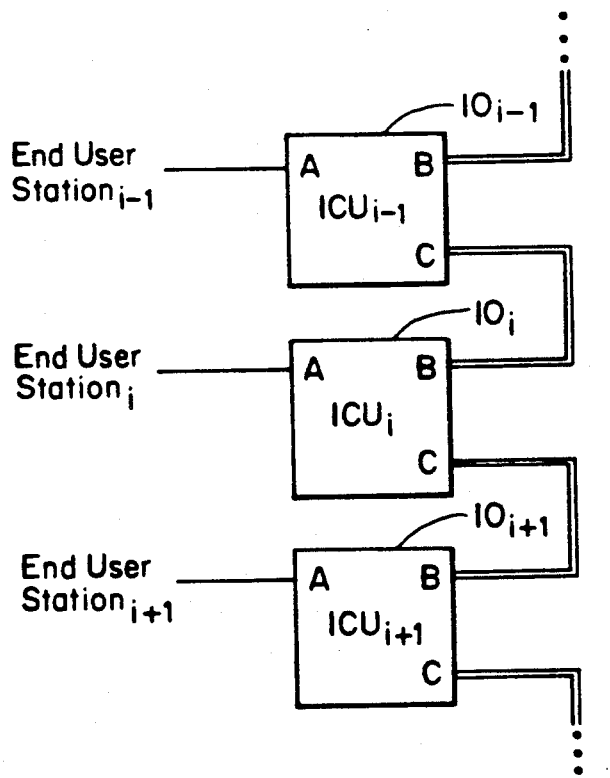
FIG. 5 is a block diagram of a number of ICU's in a cascade configuration as typically used in distributed applications.

The choice between formats depends on the distance between ICU's for the reason noted above. In a typical implementation, a number of ICU's 10 are configured in cascade form, as depicted in FIG. 5. Each ICU corresponds to an end user, or customer, and is connected to its end user through port A. The ICU's are connected together through ports B and C, where port B of the $i^{th}$ ICU $10_i$ is connected to port C of the $(i-1)^{st}$ ICU $10_{i-1}$. Hence, ports B and C of adjacent ICU's in the cascade are connected at the TTL level via the backplane of a line interface shelf (LIS).

However, it should be noted that an ICU's do not necessarily have to be coupled in a cascade configuration. Specifically only port A and either of ports B and C may be connected to an end user station and the DDS network, respectively. In this embodiment, the ICU may be used as an interface to convert data between the end user's loop format and the network's DSO format.

C. Port A

The description of port A is facilitated by considering not only port A but also the end user equipment to which port A is connected. Thus, in this section, the entire ICU-end user interface will be briefly described. Further details of the end user facility may be found in co-pending U.S. patent application Ser. No. 07/159,887.

Figure 6:
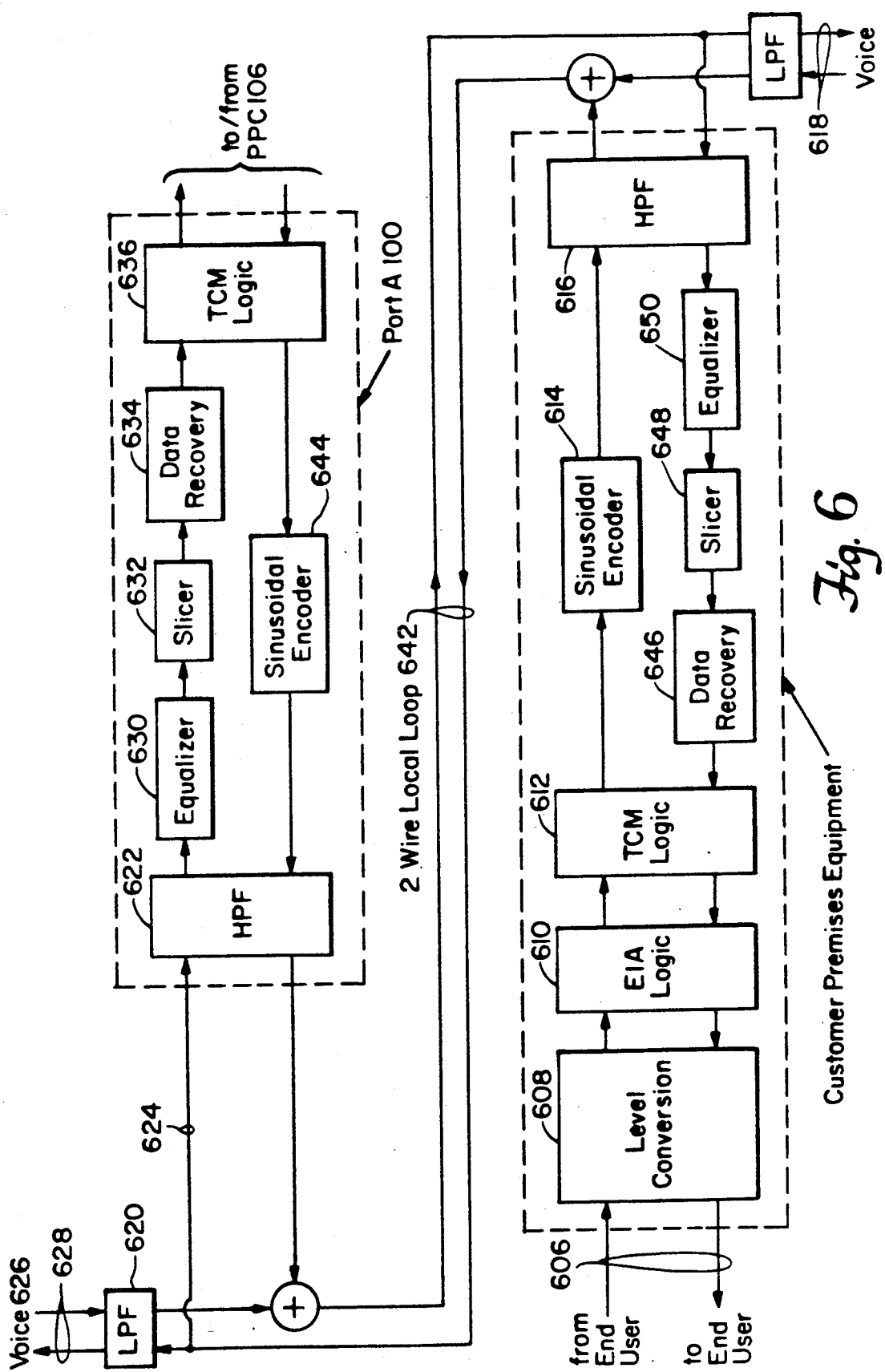
FIG. 6 is a block diagram of an ICU-end user interface.

FIG. 6 contains a block diagram of the ICU-end user interface, with the portion of the interface corresponding to port A 100 shown enclosed in dotted lines. An end user transmits and receives data over an RS-232 interface 606. The transmitted signal is converted into a standard TTL-EIA (Electronics Industries Association) signal in level converter 608. It is then converted into a DSO signal by EIA logic unit 610 and subsequently coupled to TCM logic circuitry 612.

The TCM logic circuitry sends a short burst of this data through a sinusoidal encoder 614 that shifts the baseband data to a higher frequency band, thereby vacating the voice band. The encoded higher frequency data passes through a high pass filter (HPF) 616 essentially unchanged and is then added to a (baseband) voice signal 618 originating at the end user. The combined signal is then transmitted over a two-wire local loop 642 to port A of the ICU.

At the other end of the two-wire local loop 642 (the 'entrance' to port A), the summed data and voice signal passes through both a low pass filter (LPF) 620 and a high pass filter (HPF) 622. The voice signal 626 emerging from the LPF 620 proceeds through standard telephone lines 628. The sinusoidally encoded data on line 624 enters port A 100 and upon emerging from the HPF passes through an equalizer 630 that compensates for transmission losses incurred over the two-wire local loop. The equalized signal then passes through a slicer 632, which samples the analog waveform at appropriate sampling points and converts the sampled values (via a threshold decision rule) into binary data. After the binary data stream is decoded (to decode the sinusoidal encoding) by the data recovery module 634, it is coupled to TCM logic circuitry 636, where it exits port A 100 in the DSO-TTL format and enters the PPC 106. Data port A 100 is, thus, comprised of all the units shown within the dotted box of FIG. 6.

Data flows in the same way in both directions of the path between the end user TCM logic circuitry 612 and the ICU TCM logic circuitry 636 (i.e., this path is symmetrical about the two-wire local loop 642). Hence, units 644, 646, 648 and 650 operate in the same way as units 614, 634, 632 and 630. However, when data emerges from the end user TCM logic 612 (in the reverse direction), it is rate-converted by unit 638 to the appropriate subrate and then pre-equalized by unit 640 for cable losses anticipated during the subsequent transmission over the four-wire loop.

It is important to note that although the end user and the ICU may be transmitting and receiving data simultaneously, simultaneous bidirectional communication does not occur over the two-wire local loop path labelled 642 in FIG. 6 between the two TCM units 612 and 636. Data communication across this interface is carried out in 'ping-pong' fashion. Briefly, in the ping-pong communication protocol, the data being sent from the end user to the ICU is divided into short bursts by TCM logic 612, with each burst being sent to TCM logic 636 at a data rate of 56 kb/s. Data flowing in the opposite direction is treated in a similar manner, being divided into short bursts, each of which is sent from TCM logic 636 to TCM logic 612. The data bursts in the two directions are interleaved in time, so that communication along the two wire local loop is in only one direction at any given time. Because the communication is unidirectional, although the data flows at 56 kb/s, the effective data rate in either direction is at most half of 56 kb/s and is in fact 19.2 kb/s

D. Data Processing Circuitry

Figure 1:
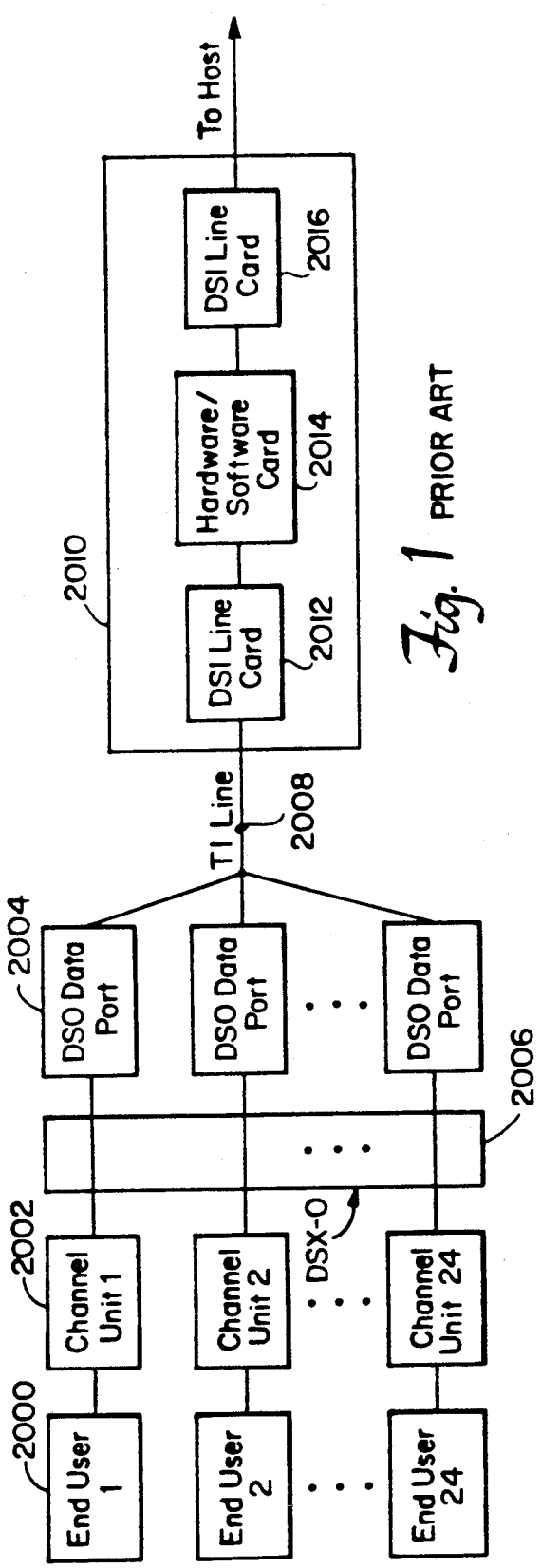
FIG. 1 is a block diagram of the DCS implementation of the prior art.

The programmable processing circuit (PPC) 106, microprocessor controller 108, and EPROM memory 110 constitute the data processing portion of the ICU. As shown in FIG. 1, DSO-TTL 64 kb/s data lines coupled to ports A, B, and C transport data to and from the PPC (via the bypass circuit 112 in the cases of ports B and C). The PPC consists of a programmable gate array such as a Xilinx 3042-50 field-programmable gate array. The controller, implemented by an Intel 80C51FA microprocessor, reads data stored in the EPROM memory 110 (a 512 kb memory cell) and programs the PPC with various hardware configurations depending on a particular application in which the ICU is being used. Moreover, the controller controls data flow through ports A, B, and C as well as the operation of the PPC through software instructions also stored in the EPROM 110. Note that the controller may reprogram the PPC in real time (i.e., while the ICU is operating and processing data) by engaging a bypass circuit 112 that temporarily reroutes data flow away from the PPC.

E. Bypass Circuitry

The general function of the bypass circuit is to provide an interface between the PPC 106 and ports B 102 and C 104. In particular, this bypass interface is capable of either allowing data to flow unhindered between the PPC 106 and the I/O ports 102 and 104 or rerouting data so that it flows directly between ports B and C without reaching the PPC. Thus, despite the name 'bypass circuit,' data passes through the bypass circuit even when the ICU is not in bypass mode, but is in normal mode (i.e., when it is functioning properly and not being reprogrammed).

The bypass circuit serves as an alternate route for data, not only during periods when the PPC is being reprogrammed by the controller, but also in the event that some part of the ICU fails, rendering the ICU ineffective. A need for a bypass circuit exists in order to overcome limitations that are due to the architectures in which ICU's are typically configured. Specifically, in distributed applications, ICU's are cascaded as shown in FIG. 5 and as described above in Section I.B. The drawback with this arrangement is that a defective ICU or an ICU that is being reprogrammed may affect a number of other ICU's in the cascade. When this problem occurs, the bypass circuitry directly connects port B to port C, essentially bypassing a disabled or inoperative ICU and, in particular, the PPC of the ICU, so that the ICU may be taken out of service temporarily without interrupting data flow to other ICU's in the system.

When the PPC is about to be reprogrammed, the controller 108 first disengages port A from the ICU and establishes a direct connection between ports B and C via the bypass circuit, so that the DSO data streams may pass through to the adjacent ICU's unchanged. The controller 108 then loads in the new circuit configuration. After the operation of the new circuit has been verified as being correct, the controller disconnects the bypass circuit, restoring data flow through the ICU as before. In this manner, the bypass circuit provides a way to reprogram the ICU to serve a different function without seriously disrupting service being offered by other ICU's in the same system.

Bypass circuitry is also engaged in the event of ICU failure. The controller of each ICU in the cascade constantly performs certain background diagnostic tests. When a fault condition is detected, the controller engages the bypass circuit, thereby decoupling the data lines from the rest of the ICU. In addition, if the controller itself fails, the bypass circuit is automatically engaged. Provided that the bypass circuit itself does not fail, only the end user that corresponds to a faulty ICU is affected by the failure of the ICU. Furthermore, since the bypass circuit is far less complex than the data processing circuitry in the ICU, the bypass circuit is far less likely to fail than the data processing circuitry. As a result, the reliability of the system is increased.

Figure 7:
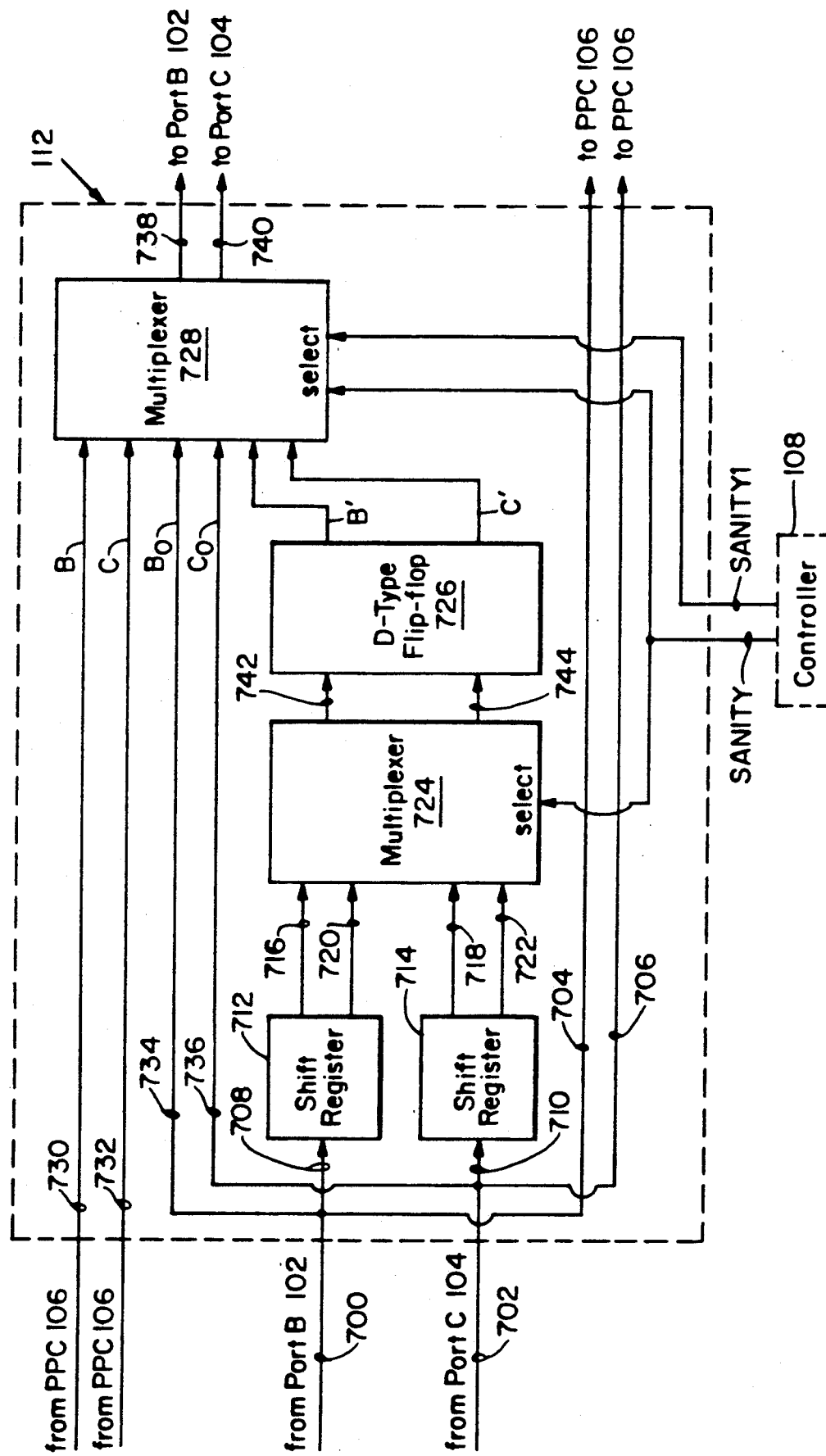
FIG. 7 is a block diagram of an ICU bypass circuit in accordance with the invention.

A block diagram of the bypass circuit is shown in FIG. 7. The data entering from ports B and C on lines 700 and 702, respectively, has two destinations. First, it is routed directly to the PPC 106 on lines 704 and 706, respectively, where it is processed along with port A data. Second, in the bypass mode, it is routed through some circuitry to ports C and B, respectively. For convenience, in this second case, the data entering from ports B and C and destined for ports C and B are hereinafter referred to as 'destination-C bypass mode data' on line 708 and 'destination-B bypass mode data' on line 710, respectively. In contrast, the data entering from the PPC on lines 730 and 732 is destined only for ports B and C respectively, and that only in normal mode, and is referred to as 'destination-C normal mode data' and 'destination-B normal mode data', respectively. In bypass mode, the data entering from the PPC consists of 'don't care' data bits.

In providing an alternate route for the data stream, it is important that the bypass circuit match any delays that would have been encountered by the bypass mode data had it traveled along the regular non-bypass route. In this way, synchronization of the out-of-service ICU with the other ICU's in the system is maintained. Since delays of zero, one, or two bytes along the non-bypass route are possible in the present embodiment, the controller 108 must determine which of the three delay amounts is appropriate for a given situation and then communicate this information to the bypass circuit in the form of two bits: SANITY and SANITY1. When the ICU is in normal mode, the controller conveys this information via the same sanity bits Table 1 below lists the four possible types of bypass circuit output as well as the values of the sanity bits for each of those cases:

TABLE I

| SANITY1 | SANITY | Bypass Circuit Output |
|---|---|---|
| 0 | 0 | normal mode |
| 0 | 1 | bypass mode: no delay |
| 1 | 0 | bypass mode: two byte delay |
| 1 | 1 | bypass mode: one byte delay |

Shift register 712 produces one and two byte delayed versions of the destination-C bypass mode data on line 708. Shift register 714 does the same for the destination-B bypass mode data on line 710. Depending on the value of the SANITY bit, either the one byte delayed versions 716,718 or the two byte delayed versions 720,722 of the destination-C and destination-B data are selected by a multiplexer 724 as output on lines 742 and 744, respectively, and subsequently clocked by D-type flip-flops 726 before arriving as two inputs B' and C' of a second multiplexer 728.

Joining these as inputs of the multiplexer 728 are the destination-B and destination-C normal mode data on lines 730 and 732, respectively, as well as the zero delay destination-B and destination-C bypass mode data on lines 734 and 736, respectively, and labelled $B_o$ and $C_o$. Using the values of both sanity bits from the controller 108, the multiplexer 728 selects one of the three input pairs as output. These DSO-TTL data streams proceed directly to port B and port C via lines 738 and 740, respectively.

F. Additional Improvements

Returning to FIG. 1, the ICU 10 has a number of improvements through which it may be controlled, tested, and monitored. The control interface 114 allows an external controller (e.g., one controlling a set of cascaded ICU's) to perform a variety of functions involving the programming of operation parameters. These functions include setting the end user subrate, selecting a particular application (e.g., SRDM or MJU), choosing a channel number for the end user in applications involving DSOB data streams, or directing a test sequence. In the absence of an external controller, the ICU defaults to the operation parameters stored in a set of option switches 122. When the external controller directs a test sequence, a maintenance interface 116 serves as a data line to send actual test patterns to the ICU and receive returned patterns from the ICU. The combination of maintenance interface and external controller as a testing mechanism is supplemented by a faceplate test interface 118, through which near-end testing (i.e., towards the end user) and far-end testing (i.e., towards the network) may be carried out. A programmable faceplate display 120, consisting of a panel of five light-emitting diodes (LED's), serves to indicate the status of the ICU at any given time, where the meaning assigned to each of the LED's depends on the particular application for which the PPC 106 has been programmed.

II. SRDM Function

The PPC 106 of the ICU 10 can be programmed to serve a number of different functions, one of which is subrate data multiplexing. SRDM allows a number of end users operating at a subrate lower than the DSO data rate of 64 kb/s to communicate over the same DSO data line. This is accomplished by partitioning the DSO data stream into a number of slots and then assigning a slot to each end user.

The specific data formats used in an SRDM system will now be described in connection with FIG. 8. A DSO data stream can be further classified as being either a DSOA or a DSOB stream. In the DSOA format, all of the data bytes in the stream correspond to a single source of data, or in the present context, to a single end user. An end user that desires to communicate over a (64 kb/s) DSOA interface at a standard subrate of 2.4 kb/s, 4.8 kb/s, or 9.6 kb/s may do so via the well-known method of 'byte repetition.' In byte repetition, a single subrate data byte is repeatedly sent over the high rate communication interface some fixed number of times ($N_c$) until the next subrate data byte is available from the end user, at which time the process repeats with this second subrate data byte, and so on. This fixed number $N_c$ depends on the relationship between the end user subrate and the standard DSO rate of 64 kb/s. In particular, it can be shown that $N_c$ is 20, 10, and 5 for the subrates 2.4 kb/s, 4.8 kb/s, and 9.6 kb/s.

Figure 8:
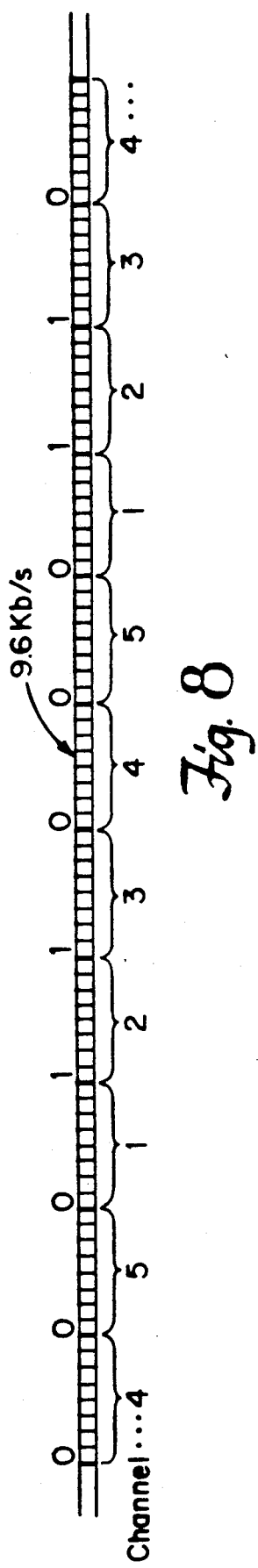
FIG. 8 depicts a 9.6 kb/s DSOB data stream with proper framing.

In a DSOB data stream, shown in FIG. 8, consecutive data bytes correspond to different end users simultaneously communicating over the DSOB interface. Each end user communicates over a particular one of the 'channels,' or 'time slots.' The maximum number of end users that can be accommodated is equal to the rate-dependent parameter $N_c$ defined above. That is, the maximum number of DSOB channels that are available for the standard data rates of 2.4 kb/s, 4.8 kb/s, and 9.6 kb/s is 20, 10, and 5, respectively.

The DSOB data bytes appear in a stream of 64 kb/s data such that the first data byte corresponds to the first end user, the second byte corresponds to the second user, and so on until the $N_c^{th}$ byte, which corresponds to the $N_c^{th}$ user. This correspondence is true of all preceding and subsequent sets of $N_c$ consecutive bytes in the data stream, so that the $(kN_c+i)^{th}$ byte corresponds to the $i^{th}$ end user, where k is an arbitrary integer and i is an integer between 1 and $N_c$ inclusive. Hence, every $N_c^{th}$ byte in the data stream corresponds to a particular end user (or, equivalently, to a particular channel or time slot).

The framing bits of consecutive bytes in the DSOB data stream form a prespecified periodic sequence. This sequence differs for each of the end user subrates (i.e., 2.4 kb/s, 4.8 kb/s, and 9.6 kb/s), as shown in Table II, and has period $N_c$, the subrate-dependent parameter defined above. Hence, the framing bit sequence (for a particular subrate) provides the correspondence between data bytes in the DSOB data stream and end users (see the correspondence between data byte framing bits and channel numbers in FIG. 8). It is possible to identify the end user number that corresponds to a particular data byte by examining the framing bit F* of the data byte together with the framing bits of $N_c-1$ other bytes chosen so that the $N_c$ bytes are consecutive in the data stream, and then noting the position of the framing bit F* in the sequence shown in Table 2. However, this would require the examination of ten and twenty framing bits for the two lower subrates.

TABLE II

| End User Subrate (kb/s) | Framing Bit Sequence | $N_c$ |
| --- | --- | --- |
| 2.4 | 01100101001110000100 | 20 |
| 4.8 | 0110010100 | 10 |
| 9.6 | 01100 | 5 |
| 19.2 | 01100 | 2 |

Figure 9:
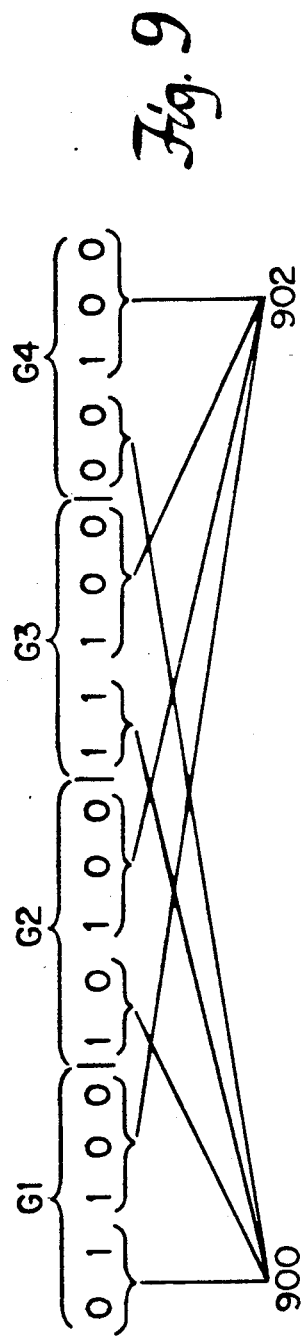
FIG. 9 illustrates the structure present in a framing bit sequence at 2.4 kb/s.

In fact, there is a structure to the two lower subrate framing bit sequences which allows channel number identification upon examination of only five consecutive framing bits. To be specific, we consider the 2.4 kb/s case. On dividing the sequence of twenty framing bits into four groups $G_1$, $G_2$, $G_3$ and $G_4$ of five bits as shown in FIG. 9, we see that the first two bits in each group are 'counting bits 900,' counting '1,2,3,0' in binary. In contrast, the last three bits 902 in each group are always '100.' Finally, no other sequence of three bits in the twenty bit sequence is '100.' As a result, given a sequence of five consecutive framing bits in which one of the five bits is the framing bit of the data byte in question, first the '100' sequence and then the values of the counting bits can be identified. Once the values of the counting bits are known, the location of the framing bit F* in the twenty bit sequence can be pinpointed, thereby permitting channel number identification. The procedure for channel number identification in the 4.8 kb/s case is essentially the same as that in the 2.4 kb/s case with the exception that the sequence is ten framing bits long, giving rise to only two groups of five bits and a counting pattern of '1,2' instead of '1,2,3,0.'

A standard subrate of 19.2 kb/s also exists in addition to the 2.4 kb/s, 4.8 kb/s, and 9.6 kb/s subrates. However, it differs from the others in that (1) standard byte repetition is not used to allow a 19.2 kb/s end user to communicate over a DSOA interface; and (2) there are certain restrictions in placing end users on a DSOB data stream. First, in the time that five data bytes are transmitted over the 64 kb/s DSOA interface, only two bytes are made available for transmission by the end user. Hence in every group of five consecutive DSOA bytes, bytes 2 and 3 contain the two end user data bytes. Bytes 1, 4, and 5 are essentially don't care bytes, and are arbitrarily assigned the value of the second end user byte for error-correction purposes.

Second, the way in which two 19.2 kb/s data bytes are placed in the corresponding five 64 kb/s bytes affects the way in which 19.2 kb/s end users are multiplexed together on a DSOB line. In particular, a maximum of two 19.2 kb/s end users may share a DSOB interface (i.e., $N_c=2$ for 19.2 kb/s), since each end user occupies two of the five available bytes. By convention, if a 19.2 kb/s end user is assigned DSOB channel n, where n is at most four, the end user's data is placed in bytes n and n+1. Since this byte allocation gives rise to one and three empty DSOB bytes when two and one end users (respectively) are communicating, the empty bytes may be filled with up to one and up to three end users operating at 9.6 kb/s. Note that only the 19.2 kb/s and 9.6 kb/s subrates can be mixed on the same DSOB interface; at 2.4 kb/s and 4.8 kb/s, all end users must operate at the same subrate. The framing bit sequence for the 19.2 kb/s subrate is the same as that for 9.6 kb/s.

Figure 10:
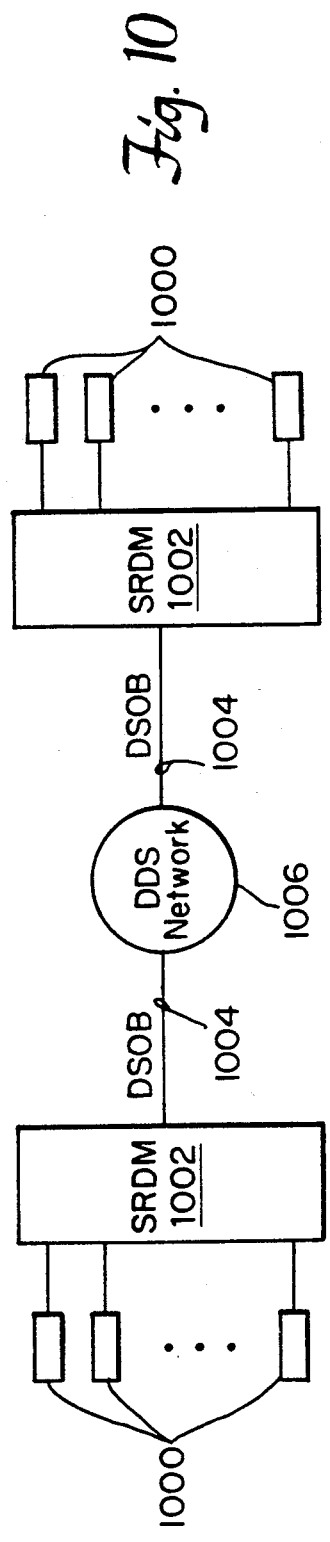
FIG. 10 is a block diagram of a typical SRDM architecture.

FIG. 10 is a block diagram of a typical SRDM architecture, in which two or more banks of end user stations 1000 utilize SRDM's 1002 to communicate over single DSOB lines 1004 leading to a Digital Data Service (DDS) network 1006.

Figure 11:
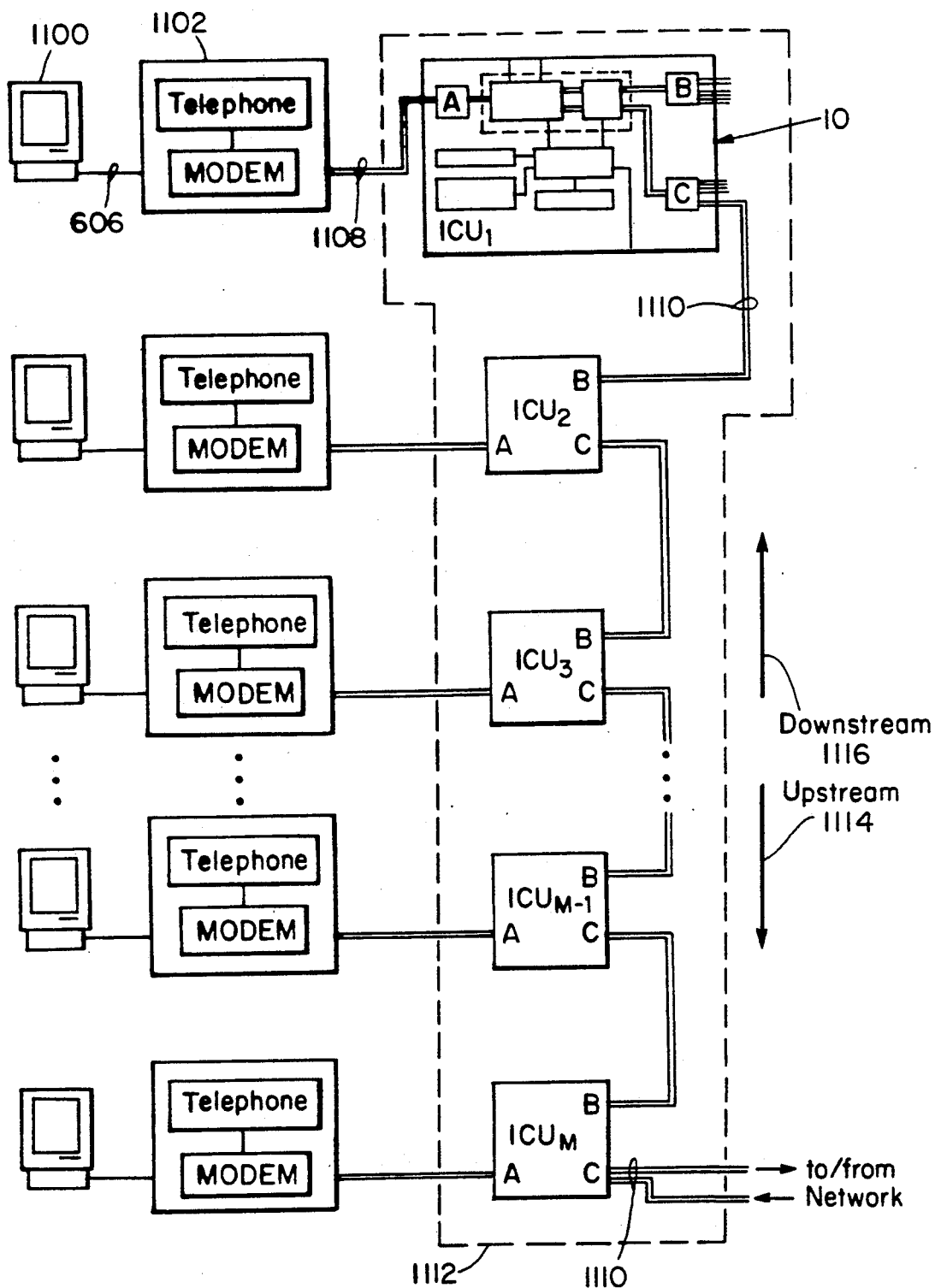
FIG. 11 is a block diagram of an SRDM system in accordance with the invention.

FIG. 11 is a more detailed block diagram of an SRDM arrangement, depicting a single bank of end user stations 1100. A number of end user data terminals 1100 are each connected to Customer Premises Equipment (CPE) 1102 (e.g., a modem) via a standard RS-232 interface 606. Each CPE is in turn connected to an ICU 10 configured to perform the SRDM function. The CPE-to-ICU connection is made at port A of the ICU using a two-wire interface 1108. Data communication across this interface is carried out in ping-pong fashion as described earlier, at an effective rate of 19.2 kb/s in each direction.

A plurality of ICU's labelled ICU1, ICU2, ..., $ICU_M$ are connected together in cascade such that port C of the $i^{th}$ ICU is connected to port B of the $(i+1)^{st}$ ICU (for all i between 1 and M−1, inclusive) via a DSOB-TTL four-wire bipolar interface 1110 that provides a full duplex connection. Note that the number of ICU's that may be cascaded together is subrate-dependent. Namely, M cannot exceed $N_c$. Port C of the $M^{th}$ ICU is connected to the network by the same DSOB interface 1110. This cascade connection, which forms a daisy-chain of ICU's, is implemented by plugging the individual ICU's into adjacent slots in the backplane of a line interface shelf (LIS) 1112. For convenience, 'upstream' is used to denote the direction towards the network (indicated by arrow 1114) and 'downstream' the reverse direction, i.e., towards the ICU$_1$, (indicated by arrow 1116) along the DSOB communication line.

Each of the ICU's is set through a mechanically-activated option switch 122 of FIG. 1 to a unique channel number, which determines the position of the corresponding end user's data in the DSOB data stream. The same channel number is used in the upstream and downstream directions. If two ICU's are set to the same channel number, data will be overwritten by the ICU that is farther upstream. Each ICU serves two basic functions: (1) insertion, i.e., receiving the DSOB data stream from the downstream direction and inserting its own data into the correct channel position and (2) extraction, i.e., receiving the DSOB data stream from the upstream direction and extracting the data from its channel position.

Insertion is handled by the ICU according to four cases: (1) the received framing pattern is correct (this is the usual case); (2) framing is incorrect (i.e., the framing bits are all zeros) because the ICU is the farthest downstream unit and hence all data bits in the 'received' DSOB stream at port B are zero; (3) framing is incorrect, the ICU is not the farthest downstream unit, and the ICU is in the office channel unit (OCU) loopback condition; and (4) framing is incorrect, the ICU is not the farthest downstream unit, and the ICU is not in OCU loopback.

In case (1), data is received from the subrate branch (TCM loop) through port A and inserted into the correct channel in the DSOB stream received from the downstream direction. The modified DSOB stream is transmitted upstream to the next ICU, if one exists, or to the network. In case (2), the ICU generates a DSOB stream with proper framing, inserts the end user data received from the subrate branch into the correct time slot, inserts the unassigned MUX channel (UMC) code byte given by 'F0011000' into the other $N_c - 1$ time slots, and transmits the resulting stream in the upstream direction. In case (3), an out-of-frame (OOF) condition exists. The ICU rejects the incoming DSOB stream, generates its own DSOB stream with proper framing, inserts its end user data into the appropriate time slot, and transmits the resulting DSOB signal to the next ICU. Finally, in case (4), the ICU passes the received DSOB stream without modification to the next ICU in the upstream direction, discarding the subrate branch data that was to be inserted. That is, the ICU is 'transparent' to the data stream.

The way in which data byte extraction from the DSOB data stream is handled by the ICU depends on whether or not the data stream received from the upstream direction (entering port C) has proper framing. If correct framing is detected, the ICU extracts the data byte corresponding to its channel number and transmits it to the subrate branch. If an OOF condition exists, the ICU rejects the incoming DSOB stream and transmits the MUX-out-of-sync special code byte 'F1001100' to the subrate branch. In both cases, the received DSOB stream is transmitted unchanged to the next ICU in the downstream direction.

Finally, note that communication in the upstream direction is independent of communication in the downstream. For example, loss of framing in one direction does not affect transmission in the other direction.

Figure 12A:
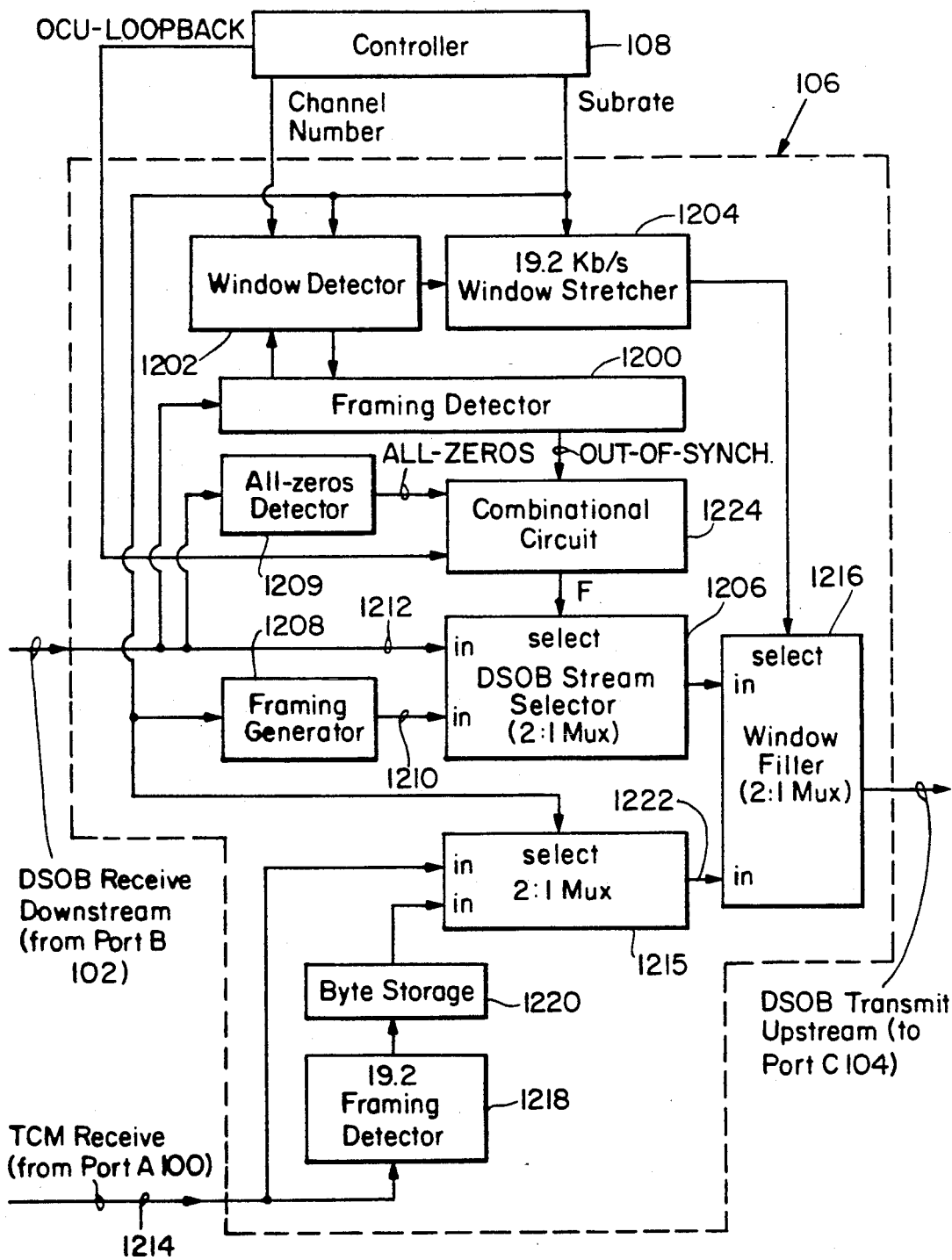
FIG. 12a is a block diagram of the data insertion portion of the SRDM hardware configuration implemented using the PPC 106 of FIG. 2.
Figure 12B:
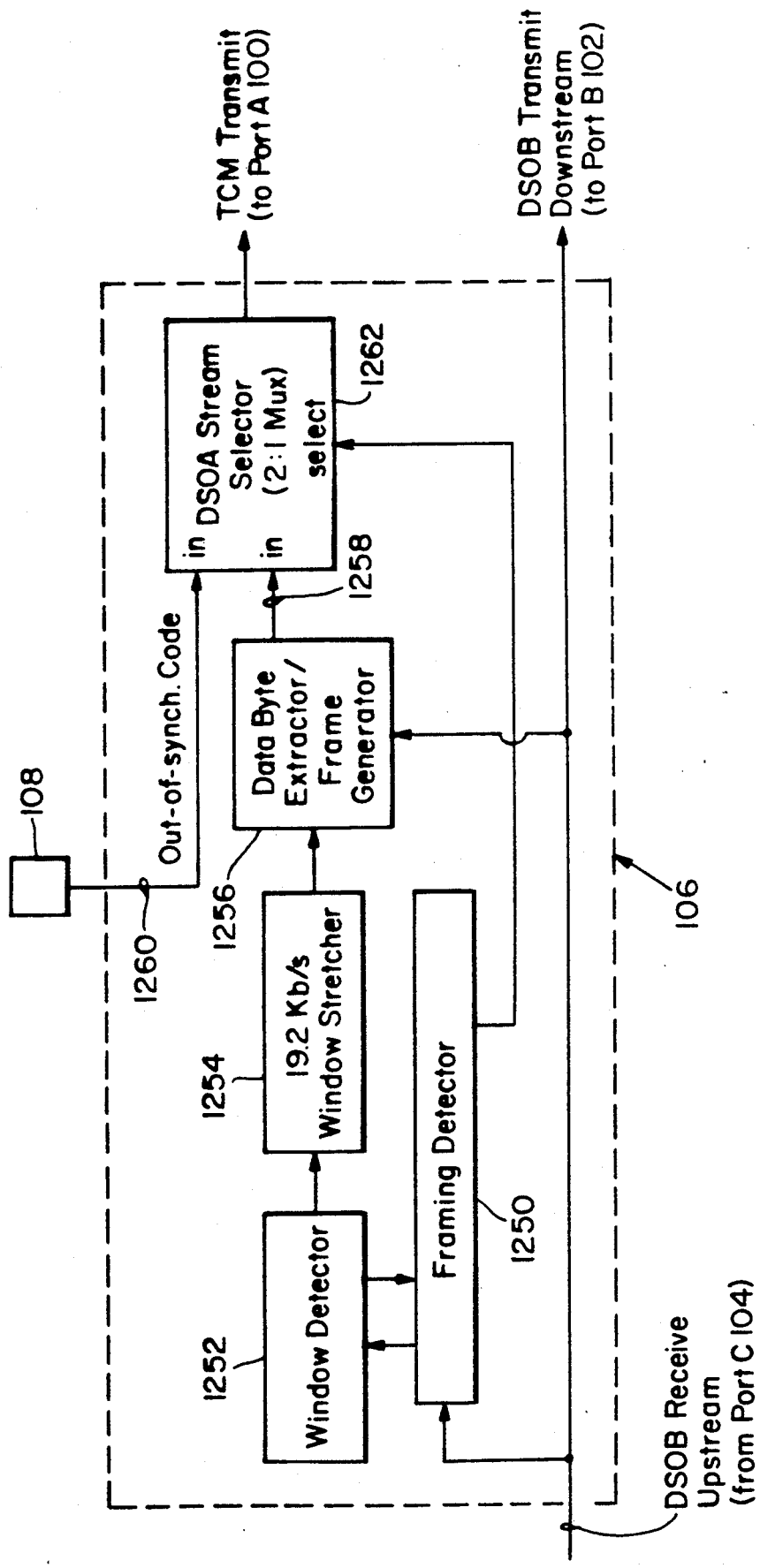
FIG. 12b is block diagram for the data extraction portion.

FIGS. 12a and 12b contain block diagrams of the SRDM hardware configuration programmed into the PPC 106 of FIG. 2. For clarity, two block diagrams FIG. 12a and FIG. 12b are shown—one for the insertion and the other for the extraction of data into/from the DSOB data stream—despite the fact that some of the hardware is common to both. FIG. 12a corresponds to 'data insertion' while FIG. 12b corresponds to 'data extraction'.

As seen in FIG. 12a, the DSOB data stream arriving from the downstream direction enters the port B input to the PPC 106, at which point it continues along two different routes: (1) to the framing detector 1200, window detector 1202, and 19.2 kb/s window stretcher 1204 and (2) to the DSOB stream selector 1206, implemented by a 2:1 multiplexer (MUX). The three units 1200, 1202, 1204 along the first route determine which DSOB channel (or pair of channels, in the case of 19.2 kb/s end user data) in which end user data is to be inserted, and will be described in more detail later.

The framing generator 1208 takes the end user subrate as input from the controller 108 and generates a DSOB data stream with all channels having the special UMC code byte 'F0011000,' where the framing bits are chosen according to the correct rate-dependent framing bit sequence of Table 2. This UMC DSOB data stream 1210 as well as the incoming port B DSOB data stream 1212 serve as inputs to the DSOB stream selector 1206, a 2:1 multiplexer.

The select line of multiplexer 1206 is a combination circuit output F whose value is determined by the values of the three input lines OUT-OF-SYNCH, ALL-ZEROS, and OCU-LOOPBACK according to the truth table given in Table III.

TABLE III

| OUT-OF-SYNCH | ALL-ZEROS | OCU-LOOPBACK | F |
| --- | --- | --- | --- |
| 0 | X | X | 1 |
| 1 | 0 | 0 | 1 |
| 1 | 0 | 1 | 0 |
| 1 | 1 | X | 0 |

The 64 kb/s port A DSOA data stram 1214 from port A corresponding to the end user travels along two routes. Along the first route, the data stream proceeds directly to a 2:1 multiplexer 1215. Along the second route, the data stream passes through a 19.2 frame detector 1218 and byte storage device 1220 before reaching multiplexer 1215 as an input. One of these two data streams (i.e., that travelling along the first or second route) is selected by multiplexer 1215 according to the end user subrate. If the subrate is 19.2 kb/s, the data travelling along the second route in selected; otherwise, that travelling along the first route is selected. The output 1222 of multiplexer 1215 enters a window filler 1216, implemented by a 2:1 multiplexer. The multiplexer 1216 chooses between the data stream exiting the DSOB stream selector 1206 and the port A data stream 1222, with the choice depending on whether or not the current DSOB channel corresponds to the end user.

The distinction between the 19.2 kb/s and non-19.2 kb/s cases is due to the following. In the non-19.2 kb/s case, since the port A data is byte repeated (i.e., each data byte in the subrate data stream is repeated in $N_c$ consecutive data bytes of the DSOA data stream), the data byte is always contained in the correct time slot in the DSOA stream (as well as in the $N_c-1$ other slots). Hence when the multiplexer 1216's select line is asserted to indicate that the current time slot is the correct one, the data to be inserted is available.

However, in the 19.2 case, the port A data on line 1214 is not byte-repeated but instead has the structure described above. This difference poses a minor problem. In particular, the two data bytes may be located only in channel positions two and three of the DSOA sequence. However, since the two data bytes may be placed in any two consecutive destination DSOB channels (for example, channels four and five), the port A data 1214 (in channels two and three) will not coincide with the destination DSOB channels at the multiplexer 1216. This problem is overcome by noting that the DSOA data bytes in channels two and three are the only bytes which have framing bits of '1'. These framing bits—and hence their associated data bytes—are detected by the 19.2 frame detector 1218 and sent to be stored in the 19.2 byte storage device 1220, from which they are sent to the window filler 1216 when the appropriate DSOB destination time slots (in the present example, slots four and five) arrive at the window filler.

Finally, the window filler 1216 chooses as its output either the DSOB data stream or the port A DSOA data stream 1214 depending on whether or not its select line is asserted. That is, if the select line is asserted as a particular DSOB channel arrives at the window filler, the data byte at port A is inserted into the DSOB data stream in that time slot. The DSOB data stream 1224 that exits the multiplexer continues to the next ICU in the upstream direction (or to the network, if the current ICU is the furthest upstream unit).

FIG. 12b is a block diagram of the data extraction hardware implementation, in which data bytes are extracted from the incoming DSOB data stream and sent to the end user. As seen in the figure, the DSOB stream received from the upstream direction through port C 104 travels along three routes: (1) to the framing detector 1250, window detector 1252, and 19.2 kb/s window stretcher 1254; (2) to the data byte extractor/frame generator 1256; and (3) to the next ICU in the downstream direction via port B, if one exists. The first route, consisting of the framing detector, window detector, and window stretcher, is the same as its data inserter counterpart (see FIGS. 12a and 13). The data stream also travels along the second route into the extractor/generator 1256. Here, a data byte (or pair of bytes, for 19.2 kb/s) is extracted from the DSOB data stream whenever the output of the window stretcher 1254 is asserted, with assertion indicating that the data byte(s) arriving at the extractor/generator lie in the channel(s) assigned to the end user. The frame generator 1256 produces a DSOA data stream 1258 in which the extracted data byte is byte-repeated to fill $N_c$ consecutive time slots, in the non-19.2 case. In the 19.2 case, channels two and three are filled with the extracted data bytes; these two framing bits are set to '1'. The other channels (one, four, and five) are filled with the data byte occupying channel three (an somewhat arbitrary choice made for error-correction considerations), with their framing bits set to '0'.

This DSOA data stream 1258 and a DSOA data stream 1260 in which each byte consists of the out-of-sync code are the inputs to the DSOA stream selector 1262, implemented by a 2:1 multiplexer. The latter input 1260 is transmitted by the multiplexer 1262 in the direction of the end user if the out-of-sync output of the framing detector 1250 is asserted; otherwise, the former input 1258 is transmitted, as is normally the case.

Units 1200, 1202 and 1204 of FIG. 12a and, equivalently, units 1250, 1252 and 1254 of FIG. 12b will now be described in detail in connection with FIG. 13.

Figure 13:
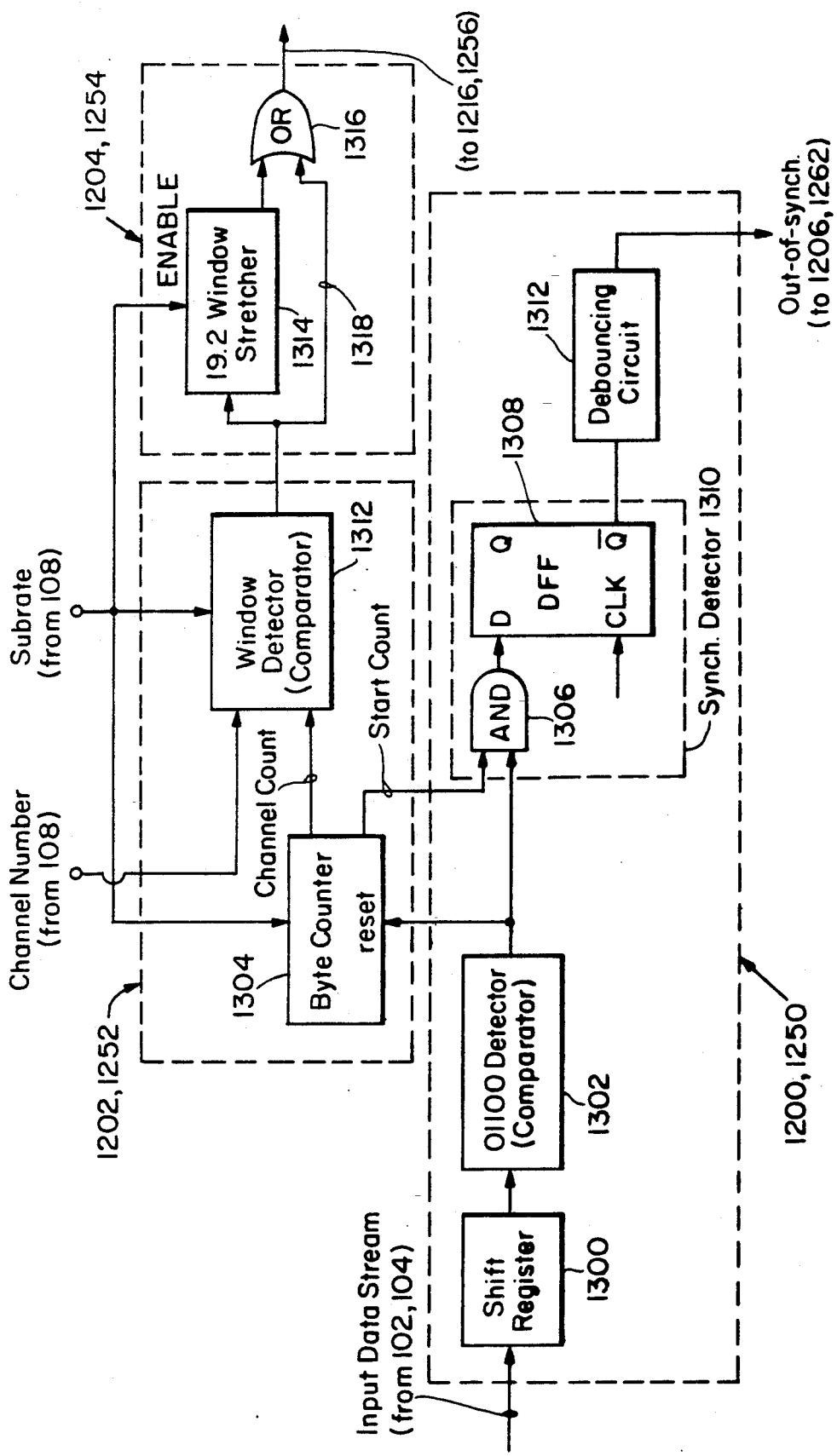
FIG. 13 is a more detailed block diagram of the framing detector 1200, 1250, window detector 1202, 1252, and 19.2 kb/s window stretcher 1204, 1254 of FIG. 12.

In FIG. 13, the DSOB data stream entering from either port B or port C enters a shift register 1300 which strips the framing bit off each byte. As each framing bit emerges from the shift register, the five bit sequence consisting of this framing bit along with the four previously stripped framing bits is compared to the framing bit sequence '01100' in the 01100 detector 1302, where '01100' are the first five framing bits in the predetermined framing bit sequences for all of the standard subrates (see Table II). If the five framing bits stripped from the incoming DSOB stream and the five bits '01100' match, then the output of the comparator 1302 is asserted. Referring to Table 2, note that, if the input DSOB stream has the correct framing bit sequence in bit one of each byte, then the output of the comparator 1302 is asserted every 20, 10, 5, and 5 shifts of the shift register 1300 for the subrates 2.4, 4.8, 9.6, and 19.2 kb/s.

The shift register 1300 and comparator 1302 begin functioning upon startup. However, the byte counter 1304 does not function until it has been reset by the comparator. This reset occurs the first time that the output of the comparator is asserted, i.e., once the 01100 detector 1302 has 'locked onto' the DSOB framing. Once the byte counter has been reset, it begins to repeatedly count the sequence 1,2, . . . ,$N_c$ at a counting rate of 8000 counts/s (which corresponds to the rate at which DSOB data bytes enter the shift register), where $N_c$ denotes the number of DSOB channels for a given subrate. Each time the counter reaches 1, the START COUNT signal is asserted. The START COUNT signal together with the output of the comparator are ANDed in AND gate 1306 and latched by a D-type flip-flop 1308 in the synch detector 1310.

The output of the synch detector 1310 indicates whether or not the framing of the DSOB data stream has been detected, verified as being correct, and locked onto; it maintains its value for a duration of $N_c$ bytes. However, in order to desensitize the frame detection scheme to occasional but rare bit errors, the ICU is considered to be out-of-frame (OOF) only when at least three consecutive framing errors have occurred (i.e., when $3N_c$ consecutive framing bits—no consecutive five of which match '01100'—have been stripped from the DSOB data stream). Similarly, the ICU exits the OOF condition once $3N_c$ consecutive framing bits having three sequences of '01100' have been stripped from the data stream. The output of the synch detector passes through a debouncing circuit 1312, which is a double counter that keeps track of how many consecutive sets of $N_c$ consecutive framing bits with and without framing errors have passed through.

The byte counter's other output, CHANNEL COUNT, is simply the value of the counter 1304. Since the byte counter begins counting upon reset by the comparator, which occurs when the comparator 1302 detects the beginning of the $N_c$ bit long framing sequence of stripped bits for the first time, the byte counter value corresponds to the number of the DSOB channel under examination in the comparator. Another comparator 1312, referred to as a window detector in FIG. 13, compares CHANNEL COUNT with the DSOB channel number assigned to the ICU and obtained from the controller 108. When they match, the window detector 1312 output is asserted, indicating that the current DSOB byte should be replaced by the end user data entering from port A. It follows that under normal operating conditions, this matching occurs every $N_c$ DSOB data bytes.

Note, however, that in the case of a 19.2 kb/s subrate, two end user data bytes are inserted into consecutive byte positions of the DSOB data stream—one at the current DSOB byte position and one at the next DSOB byte position. This is accomplished by routing the output of window detector 1312 along two separate routes, and then using the logical OR of the signals on these routes as provided by OR gate 1316 to indicate those DSOB byte positions that are to be filled with end user data.

The first route consists of a direct connection 1318 between the output of window detector 1312 and one input of OR gate 1316. Along the second route, the output of window detector 1312 passes through a window stretcher 1314 before reaching OR gate 1316 as a second input. The output of window stretcher 1314 is asserted for two consecutive data bytes if and only if two conditions are satisfied: (1) the output of window detector 1312 is asserted for the first of these two data bytes and (2) the ENABLE input of window stretcher 1314 is asserted by a signal from the controller 108 indicating that the subrate is 19.2 kb/s. Hence, if the subrate is not 19.3 kb/s, the output of window stretcher 1314 is not asserted, whereas the signal on line 1318 is asserted for only one data byte. In this case, the output of OR gate 1316 is asserted for only one data byte. If, on the other hand, the subrate is 19.2 kb/s, the output of window stretcher 1314 is asserted for two consecutive bytes, and the signal on line 1318 is asserted for the first of these two bytes. In this case, the output of OR gate 1316 is asserted for both of these data bytes.

III. Equivalents

This completes the description of the preferred embodiment of the invention. Those skilled in the art may recognize other equivalents to the specific embodiments described herein, which equivalents are intended to be encompassed by the claims attached hereto.

We claim:

1. A communication system wherein a plurality of end user stations are each coupled by communication lines to a communication port of one of a plurality of intelligent channel units that processes data from either a first data stream carrying data bytes in one direction or a second data stream carrying data bytes in the reverse direction, each said channel units comprising:
   a) first, second and third communication ports wherein end user equipment is coupled to said first port and the remaining ports of said unit are coupled in a chain to ports of other such units to form a cascade connection ending with a remote end unit, such that the third port of a first unit is coupled to the second port of a second unit, and so on, with the exception of units located at ends of this cascade, said remote end unit having one of said second port or said third port coupled to a less remote unit; and
   b) data processing circuitry for interconnecting said ports and for processing data on said streams, comprising a programmable processing circuit, a controller means and a memory device, in which the controller means reads data bits stored in the memory device to program the programmable processing circuit with a desired interconnection circuit configuration and directs the functional operation of the programmable processing circuit.

2. The system of claim 1 wherein said intelligent channel unit further includes rerouting means for rerouting data streams around the programmable processing circuit in response to a signal from the controller means.

3. The system of claim 2 wherein the rerouting means generates delayed versions of said first data stream entering the second port of said unit and delayed versions of said second data stream entering the third port of said unit and selects one of said delayed versions of said first data stream as output through the third port and selects one of said delayed versions of said second data stream as output through the second port.

4. The system of claim 3 wherein each of said first and second data streams is delayed by $N_1, N_2, \ldots,$ and $N_m$ bytes to produce M delayed versions, wherein $\{N_i\}$ and M are integers.

5. The system of claim 4 wherein the amount of delay in the selected data streams matches the delay along the non-rerouted route, for synchronization.

6. A system as claimed in claim 5 wherein $M=2$ and the rerouting means comprises:
   a) delay means to delay each data stream by $N_1$ and $N_2 \ldots N_m$ bytes to produce M delayed versions of each data stream;
   b) a first selector means to select either the $N_2$ byte delayed or $N_m$ byte delayed versions;
   c) synchronizer means for synchronizing the delayed versions with a clock signal; and
   d) a second selector means for selecting either the undelayed or the delayed versions as output.

7. The system of claim 6 wherein $N_1=1$.

8. The system of claim 1 wherein the programmable processing circuit operates as a subrate data multiplexer, and means for inserting data from the first communication port into a first data stream entering through the second port, with the resulting data stream exiting through the third port, and means for extracting data from a second data stream entering through the third data port, the extracted data exiting through the first port and the second data stream exiting through the second data port.

9. The system of claim 8 wherein the rate of the data entering/exiting through the first port includes the following subrates: 2.4 kb/s, 4.8 kb/s, 9.6 kb/s or 19.2 kb/s.

10. A method of communicating wherein a plurality of end user stations are each coupled by communication lines to a communication port of an intelligent channel unit that processes data from either a first data stream carrying data bytes in one direction or a second data stream carrying data bytes in the reverse direction, comprising the steps of:
   a) coupling end user stations to a first port of an intelligent channel unit and coupling a second and third port of the first unit to ports of other such units to form a cascade connection, such that the third port of a first unit is coupled to a second port of a second unit, and so on, with the exception of units located at ends of this cascade, said units having either said second port or said third port coupled to another unit; and b) processing the data on the data streams with a programmable processing circuit controlled by controller means and a memory device, wherein the controller means reads data bits stored in the memory device to program the programmable processing circuit with a desired configuration and to direct the operation of the programmable processing circuit.

11. A method as claimed in claim 10 further comprising rerouting data streams around the programmable processing circuit based on a signal from the controller means.

12. A method as claimed in claim 11 wherein the rerouting includes producing delayed versions of said first data stream entering the second port of said unit and producing delayed versions of said second data stream entering the third port of said unit and selecting one of said delayed versions of said first data stream as output through the third port and selecting one of said delayed versions of said second data stream as output through the first port.

13. A method as claimed in claim 12 wherein each of said first and second data streams is delayed by $N_1, N_2, \ldots$ and $N_m$ bytes to produce M delayed versions, wherein M and $\{N_i\}$ are intergers.

14. A method as claimed in claim 13 wherein the amount of delay in the selected data streams is chosen to match the delay along the non-rerouted route.

15. A method as claimed in claim 14 wherein $M=2$ and:
  a) each entering data stream is delayed by $N_1$ and $N_2$, $\ldots N_m$ bytes to produce M delayed versions of each data stream;
  b) either the $N_2$ byte delayed or $N_m$ byte delayed versions are selected;
  c) the delayed versions are synchronized with a clock signal; and
  d) either the undelayed or the delayed verions are selected as output.

16. A method as claimed in claim 15 wherein $N_1 = 1$.

17. A method as claimed in claim 10 wherein the programmable processing circuit inserts data from the first communication port into a first data stream entering through the second port, with the resulting data stream exiting through the third port, and extracts data from a second data stream entering through the third data port, the extracted data exiting through the first port and the second data stream exiting through the second data port, so that the intelligent channel unit operates as a subrate data multiplexer.

18. A method as claimed in claim 17 wherein the rate of the data entering/exiting through the first port includes the following subrates: 2.4 kb/s, 4.8 kb/s, 9.6 kb/s or 19.2 kb/s.

19. A communication system wherein a plurality of end user stations are each coupled by communication lines to a communication port of an intelligent channel unit that processes data from either a first data stream carrying data bytes in one direction or a second data stream carrying data bytes in the reverse direction, having an intelligent channel unit comprising:
  a) first, second and third communication ports wherein end user equipment is coupled to said first port and the remaining ports of said unit are coupled to ports of other such units to form a cascade connection, such that the third port of a first unit is coupled to the second port of a second unit, and so on, with the exception of units located at ends of this cascade, said units having either said second port or said third port coupled to another unit;
  b) data processing circuitry, comprising a programmable processing circuit, a controller means and a memory device, wherein the controller means reads data bits stored in the memory device to program the programmable processing circuit with a desired configuration and to direct the operation of the programmable processing circuit; and
  c) a bypass circuit comprising a rerouting means for rerouting data streams around the programmable processing circuit based on a signal from the controller means.

20. A method of communicating wherein a plurality of end user stations are each coupled by communication lines to a communication port of an intelligent channel unit that processes data from either a first data stream carrying data bytes in one direction or a second data stream carrying data bytes in the reverse direction, comprising the steps of:
  a) coupling end user equipment to a first port of an intelligent channel unit and coupling a second and third port of the first unit to ports of other such units to form a cascade connection, such that the third port of a first unit is coupled to a second port of a second unit, and so on with the exception of units located at ends of this cascade, said units having either said second port or said third port coupled to another unit;
  b) processing the data on the data streams with a programmable processing circuit controlled by controller means and a memory device, wherein the controller means reads data bits stored in the memory device to program the programmable processing circuit with a desired configuration and to direct the operation of the programmable processing circuit; and
  c) rerouting data streams around the programmable processing circuit based on a signal from the controller means.

21. An intelligent channel unit that processes and inserts data from end user equipment and from either a first data stream carrying data bytes in one direction or a second data stream carrying data bytes in the reverse direction comprising:
  a) first, second and third communication ports wherein end user equipment is coupled to said first port and the remaining ports of said unit are coupled to ports of other such units to form a cascade connection, such that the third port of a first unit is coupled to the second port of a second unit, and so on, with the exception of units located at ends of this cascade, said units having either said second port or said third port coupled to another unit; and
  b) data processing circuitry, comprising a programmable processing circuit, a controller means and a memory device, wherein the controller means reads data bits stored in the memory device to program the programmable processing circuit with a desired configuration and to direct the operation of the programmable processing circuit.

22. A unit as claimed in claim 21 further comprising a rerouting means for rerouting data streams around the programmable processing circuit based on a signal from the controller means.

23. A unit as claimed in claim 22 wherein the rerouting means produces delayed versions of said first data stream entering the second port of said unit and delayed versions of said second data stream entering the third port of said unit and selects one of said delayed versions of said first data stream as output through the third port and selects one of said delayed versions of said second data stream as output through the second port.

24. A unit as claimed in claim 23 wherein each of said first and second data streams is delayed by $N_1, N_2, \ldots$ and $N_m$ bytes to produce M delayed versions, wherein M and $N\{i\}$ are integers.

25. A unit as claimed in claim 24 wherein the amount of delay in the selected data strams is chosen to match the delay along the non-rerouted route, for synchronization.

26. A unit as claimed in claim 25 wherein $M=2$ and the rerouting means comprises:
 a) delay means to delay each data stream by $N_1, N_2, \ldots$ and $N_m$ bytes to produce M delayed versions of each data stream;
 b) a first selector means to select either the $N_2$ byte delayed or $N_m$ byte delayed versions;
 c) synchronizer means for synchronizing the delayed versions with a clock signal; and
 d) a second selector means for selecting either the undelayed or the delayed versions as output.

27. A unit as claimed in claim 26 wherein $N_1=1$.

28. A method of processing data from end user equipment and from either a first data stream carrying data bytes in one direction or a second data stream carrying data bytes in the reverse direction, comprising the steps of:
 a) coupling end user equipment to a first port of an intelligent channel unit and coupling a second and third port of the first unit to ports of other such units to form a cascade connection, such that the third port of a first unit is coupled to a second port of a second unit, and so on, with the exception of units located at ends of this cascade, said units having either said second port or said third port coupled to another unit; and
 b) processing the data on the data streams with a programmable processing circuit controlled by controller means and a memory device, wherein the controller means reads data bits stored in the memory device to program the programmable processing circuit with a desired configuration and to direct the operation of the programmable processing circuit.

29. A method as claimed in claim 28 further comprising rerouting data streams around the programmable processing circuit based on a signal from the controller means.

30. A method as claimed in claim 29 wherein the rerouting includes producing delayed versions of said first data stream entering the second port of said unit and producing delayed versions of said second data stream entering the third port of said unit and selecting one of said delayed versions of said first data stream as output through the third port and selecting one of said delayed versions of said second data stream as output through the first port.

31. A method as claimed in claim 30 wherein each of said first and second data streams is delayed $N, N+1, \ldots$, and $N+M-1$ bytes to produce M delayed versions, wherein M and N are integers.

32. A method as claimed in claim 31 wherein the amount of delay in the selected data streams is chosen to match the delay along the non-rerouted route.

33. A method as claimed in claim 32 wherein $M=2$ and:
 a) each entering data stream is delayed by N and $N+1$ bytes;
 b) either the N byte delayed or $N+1$ byte delayed versions are selected;
 c) the delayed versions are synchronized with a clock signal; and
 d) either the undelayed or the delayed versions are selected as output.

34. A method as claimed in claim 33 wherein $N_1=1$.

35. A bypass circuit for a channel unit having at least a first port, a second port and a third port comprising a rerouting means for rerouting data streams around processing circuitry of the channel unit in response to a signal from a controller means and wherein said rerouting means produces delayed versions of a first data stream travelling in a first direction entering the second port of said unit and delayed versions of a second data stream travelling in a direction opposite the first direction entering the third port of said unit and selects one of said delayed versions of said data streams as output through the third port and selects one of said delayed versions of a remaining data stream as output through the second port.

36. A circuit as claimed in claim 35 wherein each of said first and second data stream is delayed $N, N+1, \ldots, $ and $N+M-1$ bytes to produce M delayed versions, wherein M and N are integers.

37. A circuit as claimed in claim 36 wherein the amount of delay in the selected data streams is chosen to match the delay along the non-rerouted route, for synchronization.

38. A circuit as claimed in claim 37 wherein $M=2$ and the rerouting means comprises:
 a) delay means to delay each data stream by N and $N+1$ bytes to produce N byte and $N+1$ byte delayed versions of each data stream;
 b) a first selector means to select either the N byte delayed or $N+1$ byte delayed versions;
 c) synchronizer means for synchronizing the delayed versions with a clock signal; and
 d) a second selector means for selecting either the undelayed or the delayed versions as output.

39. A method as claimed in claim 38 wherein $N_1=1$.

40. A method for rerouting data stream around processing circuitry of a channel unit having first, second, and third ports based on a signal from a controller means wherein the rerouting includes the steps of producing delayed versions of a first data stream travelling in a first direction entering the second port of said unit and producing delayed versions of a second data stream travelling in a direction opposite the first direction entering the third port of said unit and selecting one of said delayed versions of said first data stream as output through the third port and selecting one of said delayed versions of said second data stream as output through the first port.

41. A method as claimed in claim 40 wherein each of said first and second data streams is delayed by $N_1, N_2, \ldots$ and $N_m$ bytes to produce M delayed versions, wherein M and $\{Ni\}$ are integers.

42. A method as claimed in claim 41 wherein the amount of delay in the selected data stream is chosen to match the delay among the non-rerouted route.

43. A method as claimed in claim 42 wherein $M=2$ and:

a) each entering data stream is delayed by $N_1$ and $N_2 \ldots N_m$ bytes to produce M delayed versions of each data stream;

b) either the $N_2$ byte delayed or $N_m$ byte delayed versions are selected;

c) the delayed versions are synchronized with a clock signal; and d) either the undelayed or the delayed versions are selected as output.

44. A method as claimed in claim 43 wherein $N_1 = 1$.

* * * * *